March 27, 1956     H. O. BLOUIN     2,739,721
HAND TRUCK WITH PICKUP AND HOLDING ATTACHMENT
Filed March 30, 1955
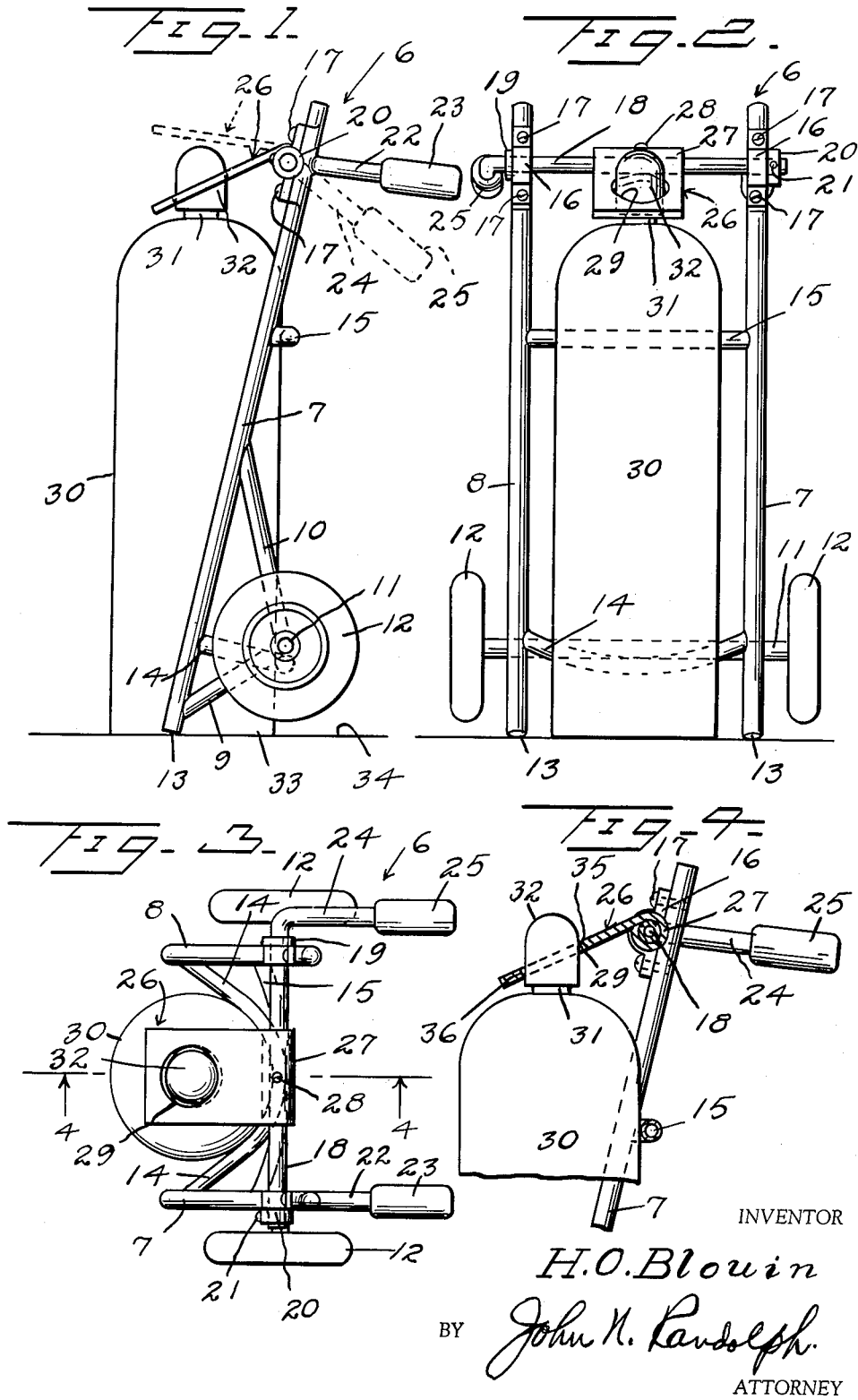
INVENTOR
H. O. Blouin
BY John N. Randolph
ATTORNEY

UNITED STATES PATENT OFFICE

2,739,721

HAND TRUCK WITH PICKUP AND HOLDING ATTACHMENT

Hibbard O. Blouin, East Fairfield, Vt.

Application March 30, 1955, Serial No. 497,918

5 Claims. (Cl. 214—380)

This invention relates to a hand truck or platform freight truck for supporting and conveying large bottles or elongated tanks of the type normally used as containers for gas, acetylene gas, oxygen and similar fluids.

A primary object of the present invention is to provide a hand truck of extremely simple construction including a pickup and holding means by means of which such conventional bottles or tanks may be readily gripped and rocked to a position wherein the container will be supported on the hand truck and effectively held immovable while being transported on the truck and substantially immovable relative to the truck while being unloaded therefrom, to thereby materially expedite loading and unloading of such containers and moving such containers short distances.

Another object of the invention is to provide a novel construction whereby the manual force utilized to support the hand truck with a container disposed thereon will additionally be utilized for securely holding the container immovably on the truck.

Still a further object of the invention is to provide a hand truck the construction of which uniquely functions in conjunction with the pickup and holding attachment thereof and the container which is transported by the truck to simplify the operation of grasping the container, of rocking the container and truck to position the container on the truck, and for rocking said parts to unload the container and disengage it from the pickup and holding unit.

Various other objects and advantages of the invention will hereinafter become more fully apparent from the following description of the drawing, illustrating a presently preferred embodiment thereof, and wherein:

Figure 1 is a side elevational view showing the truck associated with a bottle or tank type container and positioned for loading the container thereon or for unloading the container therefrom;

Figure 2 is a front elevational view of the parts looking from left to right of Figure 1;

Figure 3 is a top plan view thereof, and

Figure 4 is a fragmentary vertical sectional view of the upper portion of the truck, taken substantially along a plane as indicated by the line 4—4 of Figure 3.

Referring more specifically to the drawing, the hand truck or platform freight truck in its entirety and comprising the invention is designated generally 6 and includes two corresponding transversely spaced elongated side frame members 7 and 8. The frame members 7 and 8, adjacent corresponding lower ends thereof, are provided with diagonally extending merging brace members 9 and 10 which are disposed on the undersides thereof. An axle 11 is secured to the merging ends of the braces 9 and 10 of each pair of braces and said axle 11 has end portions projecting outwardly from said pairs of braces and on which are journaled the wheels 12 of the truck 6. Accordingly, the transversely aligned wheels 12 are disposed adjacent the lower end of the truck 6 as defined by the ends 13 of the frame members 7 and 8. The truck 6 also includes a pair of cradle members 14 and 15, each of which is secured at its ends to the side members 7 and 8. The cradle members 14 and 15 are longitudinally bowed so that the intermediate portions thereof are disposed on the underside of the plane of the members 7 and 8. The intermediate portion of the lower cradle member 14 is offset a substantially greater distance from the plane of the frame members 7 and 8 than the upper cradle member 15. The lower cradle member 14 is disposed adjacent the axle 11 and the upper cradle member 15 is disposed remote from said axle 11 and nearer the upper end of the truck 6.

Bearing members 16 are secured by fastenings 17 to the upper sides of the frame members 7 and 8, adjacent the upper end of the truck 6. Said bearing members 16 are disposed in alignment with one another for journaling a shaft 18. The shaft 18 is provided with a collar 19 which bears against the outer side of the bearing member 16 which is secured to the frame member 8 and a collar 20 is detachably secured by a fastening 21 to the shaft 18 and bears against the outer side of the other bearing 16, which is secured to the frame member 7. The shaft 18 is thus held journaled in the bearings 16. A stationary handle 22 projects from the underside of the frame member 7 and is disposed substantially opposite the intermediate part of the bearing 16 of said frame member 7. The fixed handle 22 is disposed nearly at a right angle to the frame member 7 and has a handgrip portion 23 at its outer free end. The shaft 18, as best seen in Figure 3, has a right angularly turned end portion 24 disposed beyond its fixed collar 19 and which projects generally in substantially the same direction from the truck frame as the fixed handle 22 and which likewise terminates in a handgrip portion 25.

A substantially rigid plate 26 has a rolled end forming a sleeve 27, the axis of which is disposed transversely of the plate 26. The sleeve 27 engages around an intermediate portion of the shaft 18 and is immovably secured thereto as by a fastening 28 to prevent the shaft 18 from turning relative to the plate 26. The plate 26 is thus supported substantially midway between the frame members 7 and 8. The plate 26 adjacent its opposite free end is provided with a relatively large opening 29.

A conventional bottle or tank type container of the type usually employed for holding various gases is illustrated in the drawing and designated generally 30. The container 30 has a restricted neck 31 at its upper end which is normally closed by a cap 32 of circular cross section and which is of relatively small diameter or cross sectional size as compared to the cross sectional size of the body of the container 30. The container 30 has a bottom 33 at least the outer part of which is flat and coplanar so that it may rest on a supporting surface such as a floor or platform 34 and when so disposed, the longitudinal axis of the container 30 will be disposed substantially vertical or perpendicular to the surface 34. The opening 29 is slightly larger in diameter than the external diameter of the cap 32, as illustrated in the drawing.

Assuming that the container 30 is setting upright on the surface 34, in order to position the container 30 on the truck 6, the truck is rolled on its wheels 12 up to a position adjacent the container 30 and is then rocked upwardly toward an upright position. As the truck 6 is rocked upwardly it will be readily apparent that the ends 13 of the members 7 and 8 will move into engagement with the surface 34, after which the wheels 12 will be elevated before the cradle members 14 and 15 assume positions in engagement with the body of the container 30, as seen in Figure 1. During this upward swinging movement, the pivoted handle or shaft extension 24 is swung downwardly to its dotted line position of Figure 1 so that the plate 26 will be swung upwardly to its inoperative dotted line position. Preferably, before the truck 6 has been rocked on its end portions 13 upwardly to its position of Figure 1 and while the cradle member 15 is spaced slightly from the body of the container 30, the pivoted handle 24 is swung upwardly to a point midway of its dotted line position of Figure 1 and its full line position of Figure 4 to engage the opening 29 of the plate 26 around the cap 32 and so that the upper and inner edge portion 35 of the opening 29, as seen in Figure 4, will clear the upper portion of the cap 32 which is disposed nearest the truck 6. Thereafter, when the truck has assumed its position of Figures 1 and 4, the handle 24 is swung upwardly to its position of Figure 4, substantially coplanar with the handle 22 and so that the plate 26 will be swung downwardly to its operative position, disposed at an incline downwardly and outwardly relative to the truck 6 and canted to an extent relative to the axis of the cap 32, so that the cap will be gripped by the edge portion 35 and the bottom edge portion 36 of the opening 29, which is located remote from said edge portion 35. With the truck and pickup attachment thus disposed, as illustrated in the drawing, the container 30 is gripped by the plate 26 and is ready to be picked up and conveyed on the truck 6.

To pick up the container 30, the operator, not shown, while standing to the right of the truck 6 as seen in Figure 1 and grasping the two handgrips 23 and 25, which are disposed substantially coplanar, exerts a pull thereon for rocking the truck 6 clockwise as seen in Figure 1. It will be apparent that when this occurs the plate or gripping member 26 will exert a pull on the cap 32 for rocking the container 30 clockwise with the truck 6. The container 30 will rock on the right-hand edge portion of its bottom 33 which fulcrums on the surface 34. During the initial rocking movement of the truck and container from their positions of Figure 1, the lower frame portions 13 will be elevated so that the truck 6 will be suspended out of contact with the surface 34, supported by the container 30, after which the wheels 12 will swing downwardly into engagement with the surface 34. The truck and container will then swing about the axle 11 as a pivot to raise the bottom 33 out of engagement with the surface 34. The truck 6 is supported for conveying the container 30 with the frame members 7 and 8 thereof disposed at approximately a 45° angle to the surface 34. The upper end of the truck 6, which is disposed more remote from the wheels 12 and axle 11 than the lower end of said truck is supported by the operator grasping the handgrips 23 and 25. Accordingly, an upward force is exerted on said handgrips whether the truck, supporting the container 30, is pushed or pulled. This upward force exerted on the handle 24 results in a downward force or pressure being exerted on the gripping member or plate 26 to maintain said plate canted, as illustrated in Figures 1, 2 and 4, so that the edge portions 35 and 36 thereof will frictionally grip the cap 32 to prevent the container 30 from sliding downwardly relative to the truck 6.

When the truck 6 has thus been conveyed to its destination, it is merely necessary to rock said truck upwardly to return the truck and container to the position of said parts as seen in Figures 1, 2 and 3. The handle 24 can then be swung downwardly to elevate the gripping member 26 out of engagement with the cap 32, after which the truck 6 can be swung clockwise as seen in Figure 1 away from the container 30.

It will thus be apparent that the truck 6 equipped with the pickup and holding attachment is uniquely adapted for picking up or loading, conveying and unloading containers of the type as illustrated in the drawing with a minimum of effort on the part of the operator. It will also be obvious that loading a container onto the truck and unloading of the container therefrom may be accomplished much more rapidly than is possible with other types of hand trucks.

Various modifications and changes are contemplated and may obviously be resorted to, without departing from the spirit or scope of the invention as hereinafter defined by the appended claims.

I claim as my invention:

1. A hand truck of the character described comprising an elongated frame including elongated side members, longitudinally spaced transverse cradle members secured to said side members, said frame having an upper end and a lower end and including an upper side and an underside, an axle disposed on the underside of said frame near its lower end and transversely thereof, brace members supporting said axle and secured to the frame sides, a pair of transversely aligned wheels journaled on said axle, said cradle members being bowed toward the underside of said frame, transversely aligned bearing members secured to the frame sides adjacent the upper end of said frame, a shaft extending through and journaled in said bearing members and having a laterally turned end forming a swingable truck handle extending toward the underside of said frame and disposed outwardly with respect to one of said frame sides, a rigid handle member fixed to the other frame side, near the upper end of the frame, and extending from the underside of the frame, and a gripping member fixed to said shaft between the bearings and extending upwardly from said frame, said gripping members being adapted to be swung toward the lower end of the frame by swinging movement of the pivoted handle toward the upper end of the frame and having an outer portion adapted to encircle a container end when swung toward the lower end of the frame, said gripping member being canted relative to the container part encircled thereby by swinging movement thereof toward the lower end of the truck frame for gripping said container part for holding the container immovable relative to the truck.

2. A hand truck as in claim 1, said gripping member comprising a plate having an opening in the outer part thereof adapted to fit around the first mentioned container part.

3. In combination with a hand truck including an elongated frame, a pair of laterally spaced supporting wheels located adjacent one end of said frame and a fixed handle extending from an underside of the frame adjacent the opposite upper end thereof; a shaft extending transversely of the upper end of said frame, means journaling said shaft on the frame, a gripping member fixed to said shaft substantially midway of the longitudinal sides of said frame and extending from the upper side of said frame, said shaft having a lever portion at one end thereof extending from the underside of said frame and forming a swingably mounted handle operable for swingably moving said gripping member longitudinally of the truck, and said gripping member having an outer portion adapted to encircle an end portion of a container when said gripping member is swung toward the lower end of the truck and to be canted relatively to said container portion for gripping engagement therewith to prevent sliding movement of said container longitudinally of the truck in a direction away from said gripping member.

4. In combination with a hand truck including an elongated frame, a pair of laterally spaced supporting wheels located adjacent one end of said frame and a fixed handle extending from an underside of the frame adjacent the opposite upper end thereof; a gripping member, means supported by the truck frame for swingably mounting said gripping member relative to the truck and adjacent the upper end of the truck for swinging movement longitudinally of the truck frame, said means including a lever extending from the underside of the truck and forming a second swingably mounted truck handle swingably movable toward the upper end of the truck for swinging said gripping member toward the lower end of the truck and to an operative position, said gripping member having an outer portion adapted to encircle an end portion of a container when swung toward an operative position and to be canted relative to the container portion to assume a position in gripping engagement therewith for holding said container in engagement with the truck and to prevent movement of the container relative to the truck in a direction away from said gripping member.

5. A hand truck as in claim 1, one of said cradle members being located adjacent the lower end of the frame and having an intermediate portion offset toward the underside of the frame, corresponding ends of said frame sides, constituting the lower end of said truck frame, being adapted to straddle a lower end of the container and rest on a supporting surface to support the truck in nearly an upright loading and unloading position, said lower frame end being spaced from said wheels a distance such that the wheels are disposed in an elevated position when the truck is in a loading and unloading position and whereby said truck is momentarily supported by the container when rocking with said container toward and away from the loading and unloading position of the truck to permit the truck to slide downwardly relative to the container while being rocked therewith toward an inclined carrying position.

References Cited in the file of this patent

UNITED STATES PATENTS

| | | |
|---|---|---|
| 2,381,858 | Austin | Aug. 14, 1945 |
| 2,576,048 | Schum | Nov. 20, 1951 |

FOREIGN PATENTS

| | | |
|---|---|---|
| 337,418 | Germany | May 30, 1921 |
| 977,185 | France | Nov. 8, 1950 |